(12) United States Patent
Huff et al.

(10) Patent No.: US 11,179,869 B2
(45) Date of Patent: Nov. 23, 2021

(54) METHOD AND APPARATUS FOR INCREMENTALLY FORMING PROTOTYPE PARTS WITH A HEATED STYLUS

(71) Applicant: FORD GLOBAL TECHNOLOGIES, LLC, Dearborn, MI (US)

(72) Inventors: Garret Sankey Huff, Ann Arbor, MI (US); Amanda Kay Freis, Ann Arbor, MI (US); Thomas Norton, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1158 days.

(21) Appl. No.: 15/393,897

(22) Filed: Dec. 29, 2016

(65) Prior Publication Data
US 2018/0186041 A1 Jul. 5, 2018

(51) Int. Cl.
*B29C 35/08* (2006.01)
*B29C 70/28* (2006.01)
*B29C 70/22* (2006.01)
*B29C 51/00* (2006.01)
*B29C 70/54* (2006.01)

(52) U.S. Cl.
CPC .......... *B29C 35/0805* (2013.01); *B29C 51/00* (2013.01); *B29C 70/222* (2013.01); *B29C 70/28* (2013.01); *B29C 70/54* (2013.01); *B29C 2035/0816* (2013.01)

(58) Field of Classification Search
None
See application file for complete search history.

(56) References Cited

U.S. PATENT DOCUMENTS 3,969,606 A * 7/1976 Veach .................. B43K 8/22
219/237
8,322,176 B2 12/2012 Johnson et al.
(Continued)

FOREIGN PATENT DOCUMENTS

CN 102581108 7/2012
CN 102581108 A 7/2012
(Continued)

OTHER PUBLICATIONS

Robert R. McCormick School of Engineering and Applied Science, Northwester University, AMPL/Incremental Forming at Multi-scales, © 2015 (printed Jun. 21, 2016).
(Continued)

*Primary Examiner* — Monica A Huson
*Assistant Examiner* — Kelsey C Grace
(74) *Attorney, Agent, or Firm* — Vincent Mastrogiacomo; Brooks Kushman P.C.

(57) ABSTRACT

An incremental forming machine and a process are disclosed that comprise selecting a blank and selecting a stylus that has a tip at one end. The stylus may be heated to a desired temperature before contacting the blank with the stylus to change a characteristic of the blank or part. The stylus apparatus may include a tip on an end of a shaft and a resistance heating element disposed inside the tip. Alternatively, the stylus apparatus may include an induction heating coil disposed around the tip. The tip of the stylus may have a rotatable ball that engages the blank or part.

9 Claims, 3 Drawing Sheets

(56) References Cited

U.S. PATENT DOCUMENTS

| | | | |
|---|---|---|---|
| 8,355,815 B2* | 1/2013 | Luce | B25J 11/005 |
| | | | 700/245 |
| 8,578,748 B2 | 11/2013 | Huskamp et al. | |
| 8,858,853 B2 | 10/2014 | Huskamp et al. | |
| 9,038,999 B2 | 5/2015 | Kiridena et al. | |
| 2014/0061974 A1* | 3/2014 | Tyler | B33Y 80/00 |
| | | | 264/401 |
| 2015/0061170 A1* | 3/2015 | Engel | B33Y 10/00 |
| | | | 264/40.1 |

FOREIGN PATENT DOCUMENTS

| | | |
|---|---|---|
| CN | 103192519 | 7/2013 |
| CN | 203370930 | 1/2014 |
| CN | 203370930 U | 1/2014 |
| CN | 103639249 | 3/2014 |
| CN | 105058796 A | 11/2015 |
| CN | 105710205 A | 6/2016 |
| JP | 2008080359 A | 4/2008 |
| JP | 2010253543 A | 11/2010 |

OTHER PUBLICATIONS

In'Tech Industries, Freeform Fabrication Technology (F3T), In'Tech Industries/Rapid Prototyping, Jan. 7, 2014, http://www.intechrp.com/freeform-fabrication-technology-f3t/.
First Office Action for Chinese Application No. 201711454929.1, dated May 19, 2020, 11 Pages.

\* cited by examiner

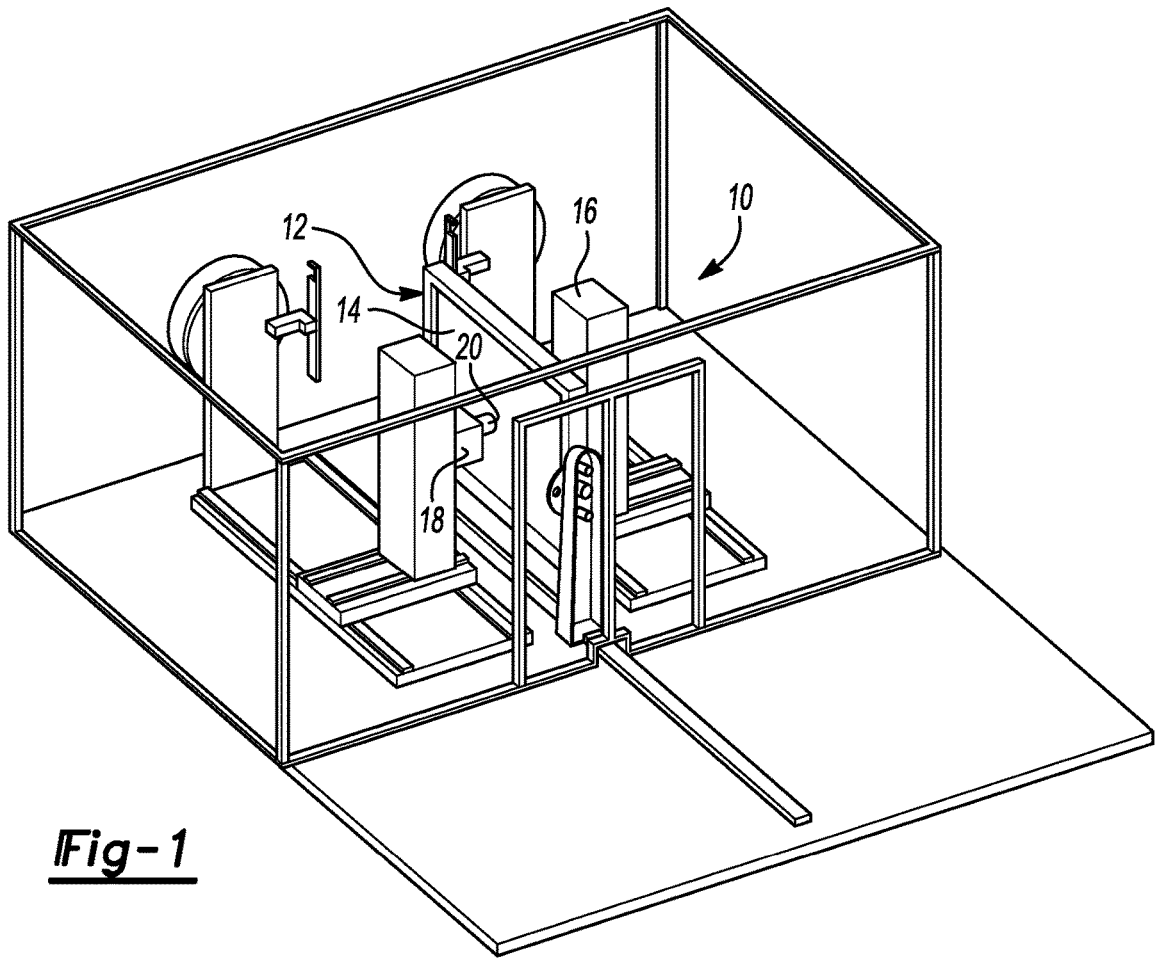
Fig-1
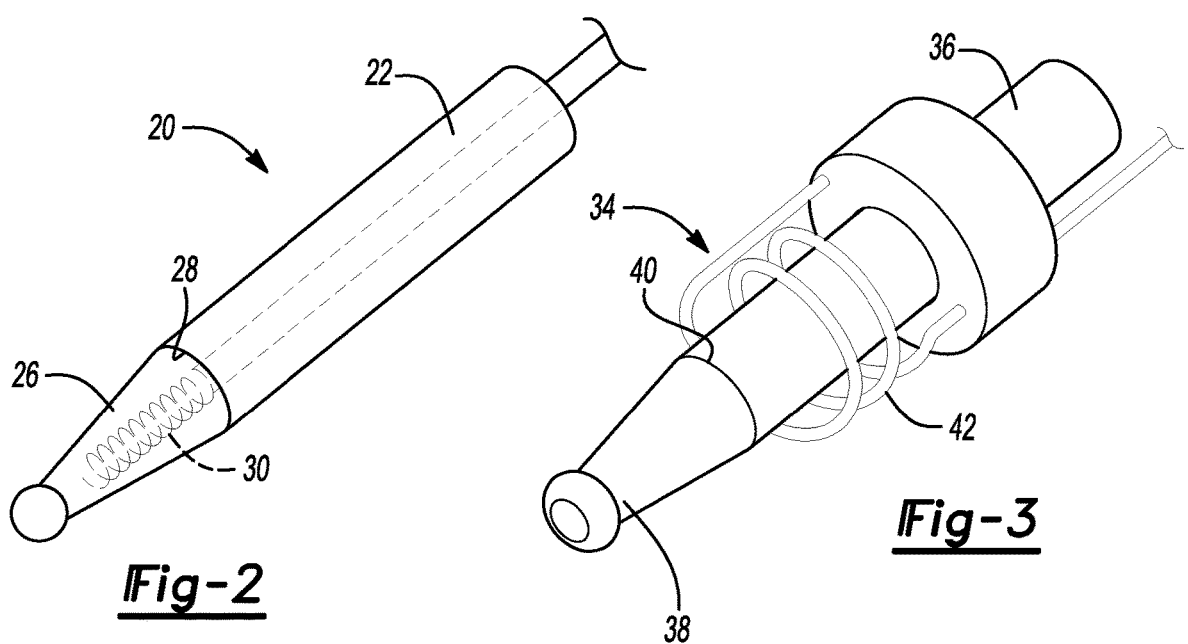
Fig-2
Fig-3

METHOD AND APPARATUS FOR INCREMENTALLY FORMING PROTOTYPE PARTS WITH A HEATED STYLUS

TECHNICAL FIELD

This disclosure relates to incremental prototype fabrication methods using a heated stylus to form fiber reinforced plastic parts and metal parts.

BACKGROUND

Prototype parts are used to validate designs prior to final sign off on production designs. After final sign off, tooling for manufacturing parts is initiated. The cost and time associated with producing prototype parts is substantial but prototype parts can eliminate costly delays and redesigns. Engineering efficiencies are increased by reducing the cost of prototype parts.

Incremental forming machines are currently used to form metal prototype parts with a robotic system having end effectors that retain one or more stylus tools that follow CAD data to locally form the sheet metal in increments. Incremental forming offers the advantages of low cost, fast delivery of prototype parts, and reduced energy consumption.

Fiber Reinforced Plastics (FRP), High Strength Low Alloy (HSLA) and Advanced High Strength (AHSS) steels and aluminum alloys (e.g. 6xxx and 7xxx-series aluminum) have unique properties that are desirable in production parts for their high strength to weight ratios, but can be difficult to form in freeform fabrication processes such as incremental forming processes used to make prototypes.

Composite sheets do not lend themselves to making prototype parts by incremental forming. Pre-impregnated woven fabric, or composite pre-cursor, blanks do not deform in shear, as metals do, but instead tend to drape over a surface. Reinforcement fibers in reinforcement fiber mats may be torn and move out of the desired position when contacted using a rigid stylus. Additionally, SMC sheets must be supported as the material flows and molds into a position. The shear movement of material is not known to consolidate or cure resin systems at this time.

In current freeform fabrication of prototypes, metal sheets are shaped with one or more rigid stylus tools that engage opposite sides of a metal blank that is retained in a frame. One problem with this approach is that it is difficult to form advanced high strength metals because they are too brittle.

This disclosure is directed to solving the above problems and other problems as summarized below.

SUMMARY

The proposed solution is to provide a heated stylus tool for an incremental forming machine that may be heated by a resistance heating element or an induction heating coil. The stylus temperature may be controlled depending upon the material to be formed and the forming process to be performed.

Composite sheets may be formed from fabrics or reinforcement fibers that are pre-impregnated with resin and consolidated by applying temperature and pressure with the stylus. A heated ball-point type stylus may be used for composite blanks to provide high consolidation forces while reducing surface strains that can disturb the fiber alignment within the resin matrix. A rotatable bearing on a stylus tip may be used to minimize distortion of the fabric while creating a desired shape, and reduce frictional forces from the forming process. A rotatable bearing stylus can directly contact the composite fabric. Alternatively, or in addition, the stylus tool may directly contact one or more metallic or polymeric sheaths placed on opposite sides of the composite sheet, fabric or reinforcement fibers to protect the surface improve the formability of the composite sheet.

Dry fibers may be encased in a sheath of plastic resin with the heat from the stylus locally liquefying resin from the sheath that penetrates the uncoated fibers. The resin penetrating the uncoated fibers cures in place upon cooling to form the FRP prototype part. Woven carbon fiber fabrics may be pre-impregnated with resin or sheathed in resin sheets that can be worked with a heated stylus and quickly cured and consolidated to provide a high speed composite prototyping system.

The heated stylus allows the composite blank or fabric to be softer at the location being formed while remaining stiffer outside the work area. The heated stylus may be used to cure composites as they are being formed, reducing the fiber misalignment in a prototype tool or component. Composite blanks may be cured after forming depending on the resin chemistry and cycle time requirements. A pre-form could then also be processed using normal production technologies.

The heated stylus tool may be controlled to heat treat a metal blank to locally change material properties of the prototype part and eliminated post forming processing. Aluminum alloys may be formed with incremental forming tools, and may receive subsequent heat treating to obtain a desired strength or material properties. Uniquely tailored heat treatments can be locally applied by the heated stylus on steel and aluminum blanks. The heated stylus may enable blanks such as 7xxx-series aluminum to be formed without hot stamping. In addition, warm forming enables the use of blanks that may otherwise be too brittle to be formed at room temperature such as advanced high strength steels and aluminum alloys.

According to one aspect of this disclosure, an incremental forming machine is disclosed that includes a fixture frame defining an opening for receiving a blank and a robot system including end effectors disposed on opposite sides of the blank. A stylus is retained by each end effector that includes a tip that forms the blank as the stylus is moved in a programmed path by the robot system. A heating element is provided on the stylus for heating the tip.

According to other aspects of this disclosure, tip may further comprise a ball and a retainer that defines a concave recess that retains the ball for rotation within the retainer. The ball is spherical and the concave recess in the retainer is partially spherical and includes an opening at a distal end of the tip. The ball and retainer may be internally heated by eddy currents generated by an induction heating coil or heated by a resistance heating element.

The incremental forming machine may further comprise a sheath supported through the fixture frame on a side of the blank that is engaged by the tip of the stylus as the tip forms the blank. The blank may be a combination of a resin and a fiber and the sheath may be formed of a resin composition that melts onto the blank as the tip forms the blank. Alternatively, the blank may be a combination of a resin and a fiber and the sheath may be formed of a metal foil that prevents distortion and tearing of the resin and fiber of the blank. Two sheaths may be supported adjacent opposite sides of the fixture frame on first and second sides of the blank. The blank may be engaged through the sheaths as the tips form the blank.

According to another aspect of this disclosure, an incremental forming machine is disclosed that comprises a fixture frame defining an opening for receiving a blank and a robot system including an end effector disposed on a side of the blank. A stylus is retained by the end effector, and includes a retainer defining a concave recess that retains a ball that rotates within the retainer. The ball forms the blank as the stylus is moved in a programmed path by the robot system.

According to another aspect of this disclosure, an incremental forming process is disclosed that comprises a first step of loading a composite blank including resin and reinforcement fibers into a frame of an incremental forming machine. A stylus is then heated to a predetermined temperature. The blank is then contacted with the stylus to consolidate the resin and fibers and incrementally form the blank.

The blank may be made of coated reinforcement fibers, fiber reinforced polymer, or sheet molding compound. The blank may include reinforcement fibers and resin and the process may further comprise melting the resin to cause the resin to flow into the reinforcement fibers and cooling the resin to solidify the resin on the reinforcement fibers. A sheath formed of resin may be retained adjacent to the blank and the stylus may be used to melt the sheath causing the resin of the sheath to flow into the blank.

The stylus may include a tip at one end that includes a ball and a retainer defining a concave recess that retains the ball for rotation within the retainer. The step of contacting the blank may further comprise rolling the ball on the blank to shape the blank.

According to another aspect of this disclosure, an incremental forming process is disclosed that comprises loading a metal blank into a frame of an incremental forming machine, heating a stylus to a predetermined temperature and contacting the blank with the stylus to heat the blank and form the blank into a desired shape.

The predetermined temperature may be selected to soften the blank to increase formability of the blank or may be selected to change a chemical condition of the blank.

A metal foil sheath may be positioned adjacent a side of the blank and the step of contacting the blank with the stylus may be performed through the sheath.

The stylus may include a tip at one end and the tip may include a ball and a retainer that defines a concave recess that retains the ball for rotation within the retainer.

The above aspects of this disclosure and other aspects will be described below with reference to the attached drawings.

BRIEF DESCRIPTION OF THE DRAWINGS

FIG. 1 is a perspective view of an incremental forming machine.

FIG. 2 is a perspective view of a fixed spherical stylus made according to one embodiment of this disclosure.

FIG. 3 is a perspective view of a fixed stylus made according to another embodiment of this disclosure.

DETAILED DESCRIPTION

Figure 4:
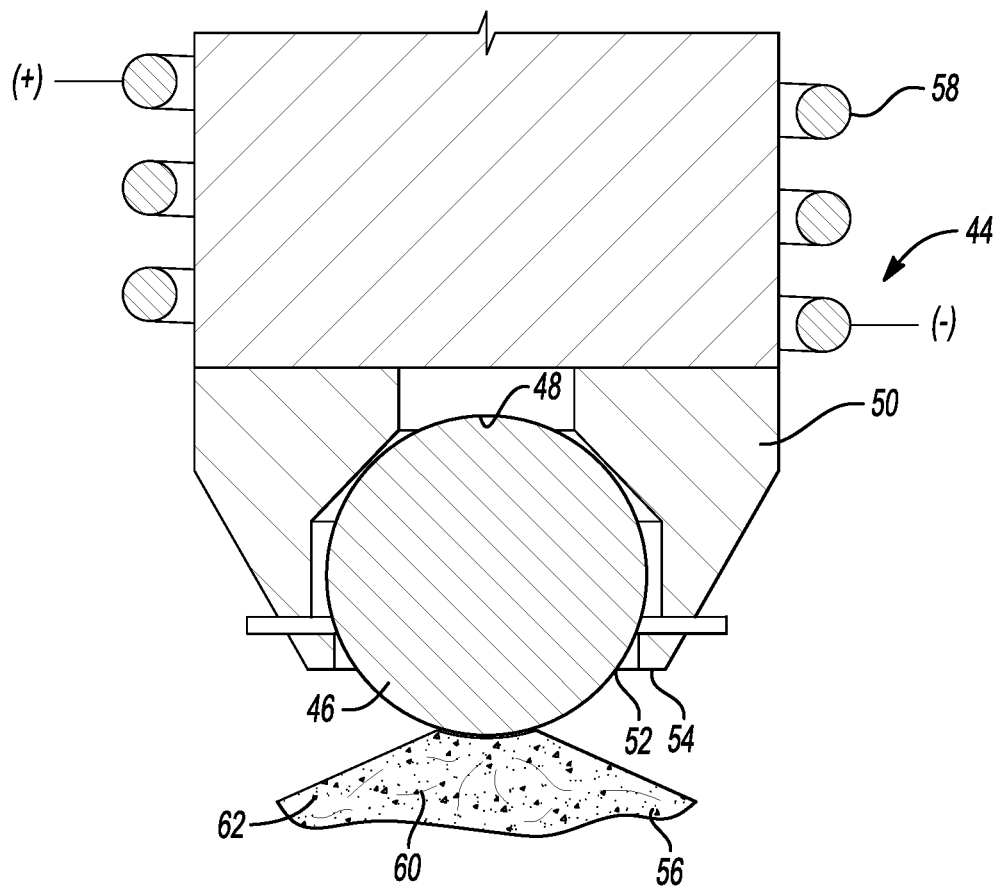
FIG. 4 is a diagrammatic cross-sectional view of a tip for a rotatable spherical stylus or ballpoint stylus that includes an induction heating element.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Referring to FIG. 1, an incremental forming machine 10 is shown that includes a fixture 12 that holds a blank 14. The fixture 12 is in a vertical position to allow multiple degrees of freedom motion devices such as multi-axis CNC machines or robots 16 to form both sides of the blank 14 at the same time or sequentially. The fixture may also be oriented in a horizontal position. The robots include end effectors 18 that retain a stylus 20, or stylus tool.

Referring to FIG. 2, a fixed spherical stylus 20 is shown that is used with the incremental forming machine to form a prototype part. The stylus 20 includes a shaft 22 and a tip 26 that is attached to an end 28 of the shaft 22. A resistance heating element 30 is provided within or near enough to the tip to heat the tip 26 to a desired temperature by conduction. The resistance heating element 30 is electrically connected to a source of electrical power. The temperature of the tip 26 is controlled by a process controller that controls the power supplied to the resistance heating element 30. The tip 26 is heated to a predetermined temperature depending on the function to be performed, e.g. melting resin or heat treating metal that will be different for different materials.

Referring to FIG. 3, a fixed stylus 34 is shown to include a shaft 36 including a tip 38 provided on one end 40 of the shaft 36. The tip 38 of the stylus is shaped to provide a broader contact point that may be used to form wider areas on a blank 14 in an incremental forming machine 10 to manufacture a prototype. Tips may also be provided in different shapes and sizes. An induction heating element 42 is disposed coaxially around the tip 38. Power is provided to the induction heating element 42 in a controlled manner by a controller to control the temperature of the tip 38. The type of heating elements and tips disclosed with reference to FIGS. 2 and 3 may be interchanged.

Referring to FIG. 4, a ballpoint tip stylus 44 is shown that includes a ball 46 disposed in a partially spherical recess 48 defined by a retainer 50. An opening 52 is provided in the retainer 50 through which the ball 46 partially protrudes. The opening 52 is defined at the distal end 54 of the retainer 50. The ball 46 shown in FIG. 3 is shown in contact with a blank/part 56.

The blank/part 56 may be an aluminum alloy, steel alloy or a fiber reinforced plastic composite as shown. The blank/part 56 shown in FIG. 4 is a fiber reinforced plastic part made up of fibers 60 and resin 62. The induction heating element 58 is shown encircling the retainer 50. The induction heating element 58 is provided with electrical power to selectively internally heat the retainer 50 and ball 46 by inducing eddy currents in the retainer 50 and ball 46 generated by the induction heating coil 58.

Figure 5:
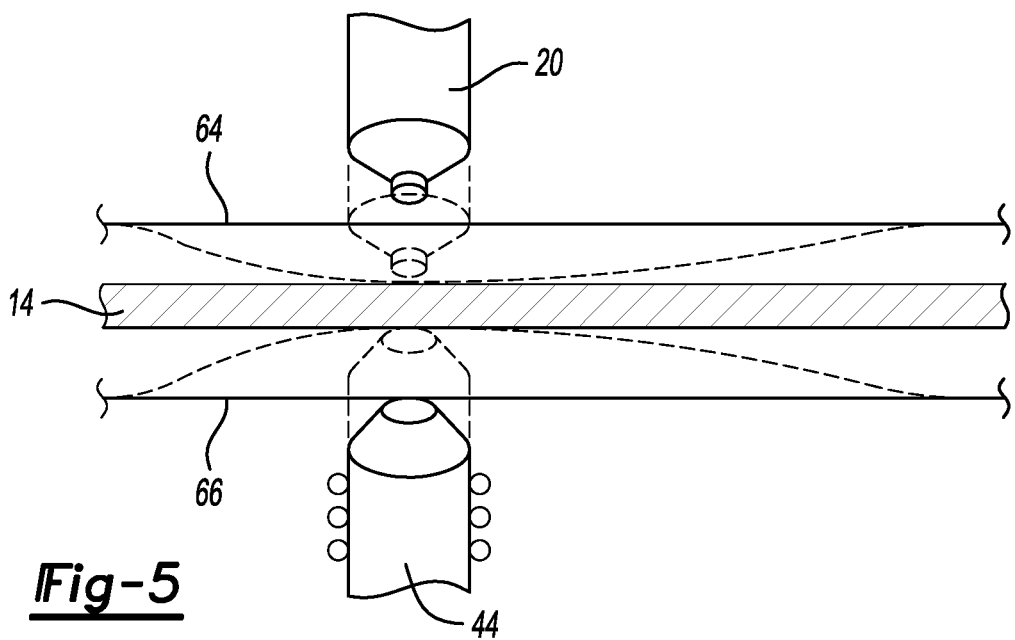
FIG. 5 is a diagrammatic cross-sectional view of a tip for a pair of ballpoint styluses engaging sheaths on opposite sides of a blank.

Referring to FIG. 5, two styluses 20, 44 are shown in solid lines in position to contact a blank through two sheaths 64 and 66 disposed on opposite sides of the blank 14. Two different styluses are illustrated but the styluses could be the same or could be provided in different combinations. The two styluses are shown in phantom lines contacting the blank 14 through the two sheaths 64 and 66 on opposite sides of the blank 14. The sheaths 64 and 66 may be metal foil that resists tearing or marking the surface of the blank 14. Alternatively, the sheaths may be formed from a polymeric resin or non-stick material such as polytetrafluoroethylene (PTFE). Resin sheaths may be melted into a composite blank to add resin to the blank or to be melted onto reinforcement fibers.

Figure 6:
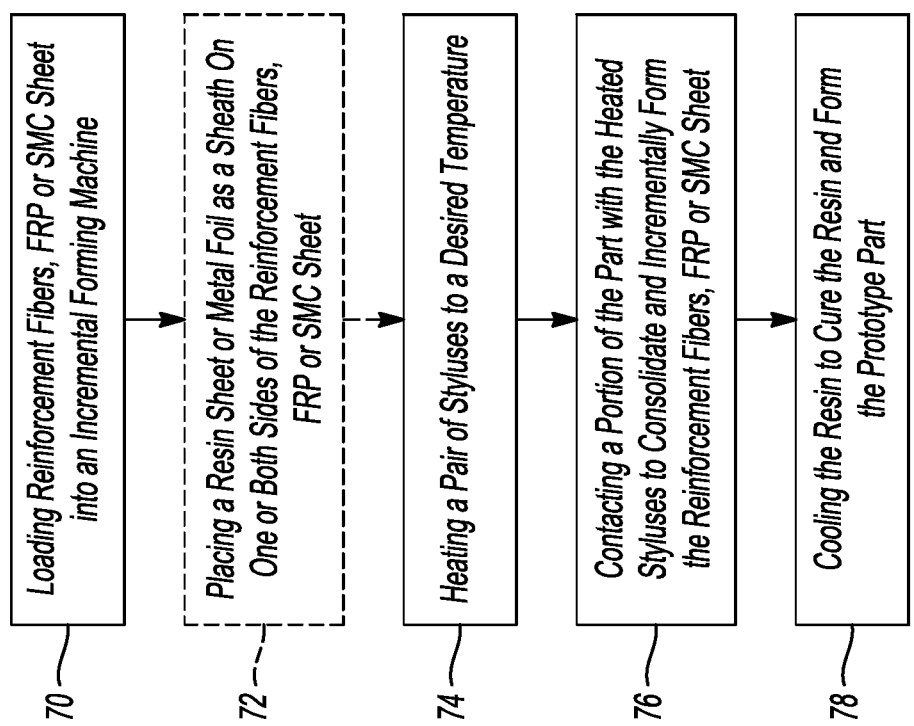
FIG. 6 is a flowchart of an incremental forming process illustrating a process for forming a resin and reinforcement fiber composite blank.

Referring to FIG. 6, a flowchart for an incremental forming process is provided to illustrate one example of the process of making prototypes in accordance with disclosure. The process begins at 70 by loading a blank 14 into an incremental forming machine. The blank 14 may be a fiber reinforced plastic composite panel or reinforcement fibers in various forms. In an alternative step at 72, a resin sheet may be placed as a sheath 62, 64 on a plurality of reinforcing fibers 60. The styluses are heated at 74 to a predetermined temperature. Alternatively, a fiber reinforced plastic composite may be provided as a sheet molding compound sheet (SMC) or as a fabric including reinforcing fibers that are pre-impregnated with a resin. The shaped part is then contacted in a localized area with the heated stylus and the blank 14 is formed at 76 into a shaped part in an incremental forming machine 10. The stylus is heated at 64 to a desired temperature depending upon the characteristic of the blank 14 that is to be altered by being contacted by the heated stylus 44. After the part is contacted with the heated stylus 44, a characteristic of the part is changed by the heated stylus that also facilitates shaping of the part. If the part is a fiber reinforced plastic composite part, the resin contained in either the resin sheet or pre-impregnated on the reinforcing fibers may be melted as it is shaped and formed into the part shape and is subsequently cured or solidified when the heated stylus is removed from the part as shown at 78.

Figure 7:
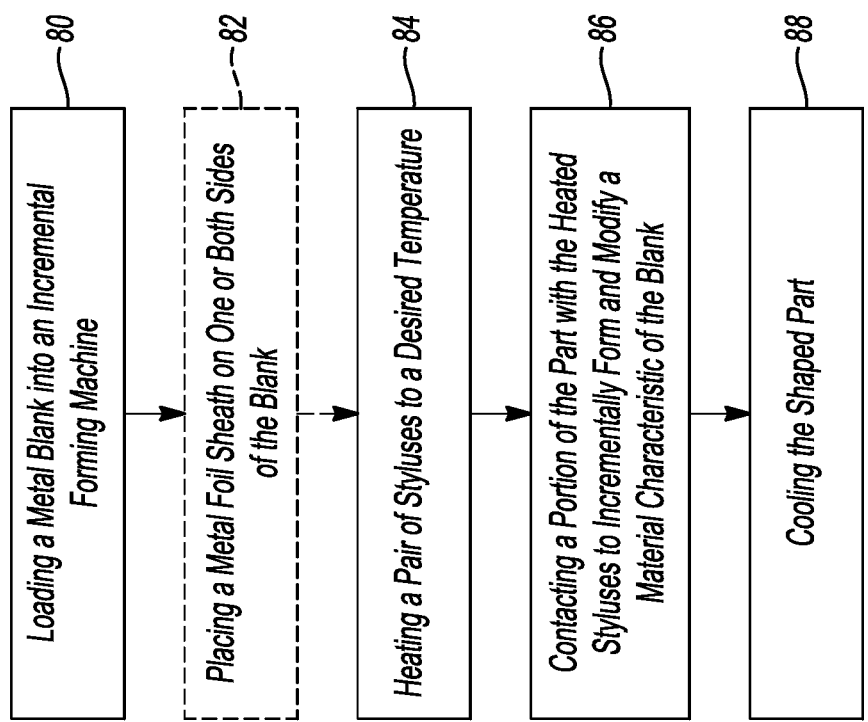
FIG. 7 is a flowchart of an incremental forming process illustrating a process for forming a metal sheet.

Referring to FIG. 7, the blank 14 may be a sheet metal blank formed of aluminum alloy or steel alloy. The blank 14 is loaded into an incremental forming machine at 80. In an alternative step, the blank 14 may be placed between two sheaths 64 and 66 (as shown in FIG. 5) at 82. A pair of styluses 20 and 44 (as shown in FIG. 5) is heated at 84 to a desired temperature. The sheaths may be provided to protect the surface of the blank 14. If the shaped part is an aluminum or steel alloy, the part may be heat treated in a limited area or portion of the shaped part when the part is contacted by heated styluses at 86. After heating, the metal sheet is allowed to cool at 88 thereby changing a metallurgical characteristic of the part in the area contacted by the heated stylus.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. An incremental forming machine comprising:
a fixture frame defining an opening for receiving a blank;
a robot system including end effectors disposed on opposite sides of the blank;
a stylus tool retained by each end effector includes a tip that engages the blank to change the blank as the stylus tool is moved in a programmed path by the robot system;
a heating element heats the tip to a selected temperature; and
a sheath supported adjacent the fixture frame on a side of the blank that is engaged by the tip of the stylus tool as the tip forms the blank.

2. The incremental forming machine of claim 1 wherein the tip further comprises:
a ball; and
a retainer defining a concave recess that retains the ball, wherein the ball is rotatable within the retainer.

3. The incremental forming machine of claim 2 wherein the ball is spherical and the concave recess is partially spherical and includes an opening at a distal end of the tip.

4. The incremental forming machine of claim 2 wherein the ball and retainer are internally heated by eddy currents generated by an induction heating coil.

5. The incremental forming machine of claim 2 wherein the ball and retainer are heated by a resistance heating element.

6. The incremental forming machine of claim 1 wherein the blank is a combination of a resin and a fiber and the sheath is formed of a resin composition, and wherein the sheath is melted onto the blank as the tip forms the blank.

7. The incremental forming machine of claim 1 wherein the blank is a combination of a resin and a fiber and the sheath is formed of a metal foil, and wherein the sheath prevents distortion and tearing of the resin and fiber of the blank.

8. The incremental forming machine of claim 1 further comprising:
first and second sheaths supported adjacent opposite sides of the fixture frame on first and second sides of the blank that is engaged by the tip of each stylus tool retained by each end effector as the tips form the blank.

9. An incremental forming machine comprising:
a fixture frame defining an opening for receiving a blank;
a robot system including an end effector disposed on a side of the blank;
a stylus tool retained by the end effector, wherein the stylus tool includes a retainer defining a concave recess that retains a ball that rotates within the retainer as the ball engages the blank to change the blank as the stylus tool is moved in a programmed path by the robot system; and
a sheath supported adjacent the fixture frame on a side of the blank that is engaged by the ball of the stylus tool as the ball forms the blank.

* * * * *